(12) United States Patent
Egedal

(10) Patent No.: US 8,342,801 B2
(45) Date of Patent: Jan. 1, 2013

(54) METHOD FOR CONTROLLING OF AT LEAST ONE ELEMENT OF A FIRST COMPONENT OF A WIND TURBINE, CONTROL DEVICE AND USE OF THE CONTROL DEVICE

(75) Inventor: Per Egedal, Herning (DK)

(73) Assignee: Siemens Aktiengesellschaft, München (DE)

( * ) Notice: Subject to any disclaimer, the term of this patent is extended or adjusted under 35 U.S.C. 154(b) by 1224 days.

(21) Appl. No.: 12/215,373

(22) Filed: Jun. 26, 2008

(65) Prior Publication Data
US 2009/0004009 A1    Jan. 1, 2009

(30) Foreign Application Priority Data
Jun. 28, 2007  (EP) .................................. 07012714

(51) Int. Cl.
- B64C 11/00 (2006.01)
- B64C 27/00 (2006.01)
- F01D 5/18 (2006.01)

(52) U.S. Cl. ........................ 416/1; 416/11; 416/157 R

(58) Field of Classification Search .............. 416/162, 416/147, 1, 155, 156, 157 R, 157 B, 11, 140; 415/4.1, 4.2, 4.4

See application file for complete search history.

(56) References Cited

U.S. PATENT DOCUMENTS

| | | | |
|---|---|---|---|
| 4,545,728 A * | 10/1985 | Cheney, Jr. ................... 416/11 |
| 4,648,801 A * | 3/1987 | Wilson ............................ 416/171 |
| 5,140,856 A * | 8/1992 | Larsen ............................. 73/455 |
| 6,176,675 B1 * | 1/2001 | Engstrom ...................... 415/4.3 |
| 6,465,901 B2 * | 10/2002 | Croes .............................. 290/55 |
| 6,582,196 B1 * | 6/2003 | Andersen et al. ............ 416/202 |
| 6,672,837 B1 * | 1/2004 | Veldkamp et al. ............ 416/144 |
| 7,218,012 B1 * | 5/2007 | Edenfeld ........................ 290/44 |
| 7,244,102 B2 * | 7/2007 | Delucis ......................... 416/156 |
| 7,365,447 B2 * | 4/2008 | Yoshida ......................... 290/55 |
| 7,436,083 B2 * | 10/2008 | Shibata et al. ................ 290/44 |
| 7,449,794 B2 * | 11/2008 | Guey et al. .................... 290/44 |
| 7,658,594 B2 * | 2/2010 | Christensen et al. ..... 416/157 A |
| RE41,326 E * | 5/2010 | Delucis et al. ................ 416/156 |
| 7,717,673 B2 * | 5/2010 | Menke ............................ 416/1 |
| 7,928,593 B2 * | 4/2011 | Ollgaard ........................ 290/44 |
| 8,015,865 B2 * | 9/2011 | DeFilipp ........................ 73/147 |
| 2009/0155075 A1 * | 6/2009 | Guey et al. .................... 416/147 |

FOREIGN PATENT DOCUMENTS

| | | |
|---|---|---|
| CA | 2492353 A1 | 7/2006 |
| DE | 10212305 A1 | 10/2003 |
| EP | 1101936 A2 | 5/2001 |
| WO | WO 0234664 A1 | 5/2002 |
| WO | WO 02064485 A2 | 8/2002 |
| WO | WO 03100249 A1 | 12/2003 |

* cited by examiner

Primary Examiner — Chris Chu

(57) ABSTRACT

The invention concerns a method for controlling of at least one element of a first component of a wind turbine and a control device not permanently belonging to the wind turbine wherein the control device is connected to a communication interface of the first component for supporting the mounting of the first component and a second component of the wind turbine with each other and/or for the purpose of service of the wind turbine. Moreover the invention concerns the use of the control device for controlling of at least one element of a first component of a wind turbine during the mounting of the first component and a second component of the wind turbine with each other and/or during a service procedure of the wind turbine.

6 Claims, 2 Drawing Sheets

METHOD FOR CONTROLLING OF AT LEAST ONE ELEMENT OF A FIRST COMPONENT OF A WIND TURBINE, CONTROL DEVICE AND USE OF THE CONTROL DEVICE

CROSS REFERENCE TO RELATED APPLICATIONS

This application claims the benefits of European application No. 07012714.7 filed Jun. 28, 2007 and is incorporated by reference herein in its entirety.

FIELD OF INVENTION

The invention relates to a method for controlling of at least one element of a first component of a wind turbine. The invention concerns also a control device as well as the use of the control device for controlling of at least one element of a first component of a wind turbine.

BACKGROUND OF THE INVENTION

A wind turbine comprises several components like a tower, a nacelle, a generator, a rotor comprising a hub and rotor blades and so on. To build up the wind turbine these partially very heavy components must be mounted with each other.

So before the rotor is raised and mounted on the nacelle, it is assembled at the ground. Thereby each rotor blade is mounted on a respective rotor blade bearing located at the hub with a lot of bolts, which have to pass through bolt holes of a rotating part of the rotor blade bearing. The rotating part of each rotor blade bearing has a certain swivel range or adjustment range for the adjustment of the pitch of the respective rotor blade mounted on that rotor blade bearing. Thus the rotor blade has to be mounted on the rotating part of the respective rotor blade bearing in a certain defined position that in later operation of the wind turbine the pitch of this rotor blade is correctly adjustable.

In the course of the mounting of a rotor blade on a rotor blade bearing therefore the rotor blade bearing has to be oriented, swivelled or turned e.g. with an electrical or hydraulic system to get the right position for mounting in relation to the orientation of the rotor blade. Additionally the rotor blade bearing has to be many times vibrated during the mounting to overcome the friction or slight deadlocks between the bolts of the rotor blade and the bolt holes of the rotating part of the rotor blade bearing.

In particular when a hydraulic system located in the hub is used for turning, swivelling or adjusting the rotating part of a rotor blade bearing during the operation of the wind turbine for the adjustment of the pitch of the rotor blade as well as during the mounting of the rotor blade and the rotor blade bearing of the hub with each other until now in the course of the mounting a lot of or all cables at hydraulic valves of the hydraulic system were removed from the hydraulic valves and a hydraulic adjustment device particularly cables of the hydraulic adjustment device were connected to the hydraulic valves. By controlling of the hydraulic adjustment device it was possible to turn, swivel or adjust the rotor blade bearing particularly the rotating part of the rotor blade bearing as required. This proceeding of removing of the cables of the hydraulic system from the hydraulic valves of the hydraulic system, of connecting of the hydraulic adjustment device to the valves and of reconnecting of the cables of the hydraulic system to the hydraulic valves after the mounting takes a lot of time. Furthermore there is a not negligible risk for connecting wrong cables of the hydraulic system to the hydraulic valves after the mounting as a result of mix-up.

SUMMARY OF INVENTION

It is therefore an object of the present invention to provide a method as initially mentioned in such a way, that the mounting or assembling of components of a wind turbine is simplified. It is a further object of the invention to indicate an appropriate control device as well as the use of the control device.

This object is inventively achieved by a method for controlling of at least one element of a first component of a wind turbine using a control device not permanently belonging to the wind turbine wherein the control device is connected to a communication interface of the first component for supporting the mounting of the first component and a second component of the wind turbine with each other and/or for the purpose of service of the wind turbine. According to the invention it is not necessary in the course of the mounting of a first component and a second component of a wind turbine with each other to change any basic existing technical arrangement of the components e.g. to change any basic existing cabling in particular any basic existing electrical or hydraulic cabling of the components for controlling of at least one element of a first component which is e.g. to be oriented relatively to the second component before mounted with the second component. In fact the invention proposes to leave the basic existing technical arrangements of the components substantially unchanged and to connect a control device to a communication interface of the first component. Thus even in the not assembled status of the first and the second component of the wind turbine or the wind turbine as a whole the control device can based on the existing technical arrangement of the first component communicate with the first component and thus control at least one element of the first component for supporting the mounting of the first and second component of the wind turbine with each other e.g. by controlling the orientation of the at least one element of the first component relatively to the second component. Preferably the control device thereby communicates with a control of the first component.

According to an embodiment of the invention the control device comprises a communication interface which is directly connected to the communication interface of the first component or which is connected to a communication bus to which the communication interface of the first component is connected. Thereby the control device is the master and the first component or a control of the first component is the slave during the communication.

According to a variant of the invention the control device provides at least one control instruction or control command to a control of the first component for controlling at least the one element of the first component. The control instructions or control commands coming from the control device are processed and/or converted by the control of the first component to conduct the respective desired adjustment of at least the one element of the first component.

As a rule the control device comprises at least one input element, preferably in form of at least one button, one joystick and/or one switch which can be used by an operator of the control device.

In one embodiment of the invention the first component is a hub, the one element of the first component is a rotor blade bearing and the second component is a rotor blade of a wind turbine. In this case a rotating part of the rotor blade bearing is oriented, swivelled and/or rotated by an input at the control device during the mounting of the hub and the rotor blade with each other and/or the rotating part of the rotor blade bearing is vibrated and/or oscillated by an input at the control device during the mounting of the hub and the rotor blade with each other.

According to another variant of the invention the control device supplies the first component with electrical energy. During the mounting of the first and the second component with each other both components are as a rule not supplied with electrical energy from equipment of the wind turbine. For operating e.g. the control of the first component the control device therefore supplies the first component with electrical energy during the mounting.

The object concerning the control device is inventively achieved by a control device for controlling of or by a control device controlling at least one element of a first component of a wind turbine which control device does not permanently belong to the wind turbine and which is combinable with a communication interface of the first component for supporting the mounting of the first component and a second component of the wind turbine with each other and/or for the purpose of service of the wind turbine. Thus the control device supports the mounting of the first component and the second component of the wind turbine with each other and/or the service of the wind turbine.

The advantages mentioned before apply also to the control device.

For supplying the first component with electrical energy during the mounting the control device comprises according to a variant of the invention a bus bar and/or an interface for the electric power supply of the first component.

According to an embodiment of the invention the control device is a hand-held control device. Thus the control device is comparatively easy to handle and preferably free movable except for the power cable connected to the bus bar, the power supply cable for the hub and/or the connection for the communication. But these conduits can be chosen as long as necessary for a quasi free movement of the hand-held control device.

The third object of the invention is achieved by the use of a separately designed, quasi free movable control device for controlling of or controlling at least one element of a first component of a wind turbine during the mounting of the first component and a second component of the wind turbine with each other and/or during a service procedure of the wind turbine.

BRIEF DESCRIPTION OF THE DRAWINGS

The invention will in the following be explained in more detail with reference to the schematic drawings, where.

DETAILED DESCRIPTION OF INVENTION

Figure 1:
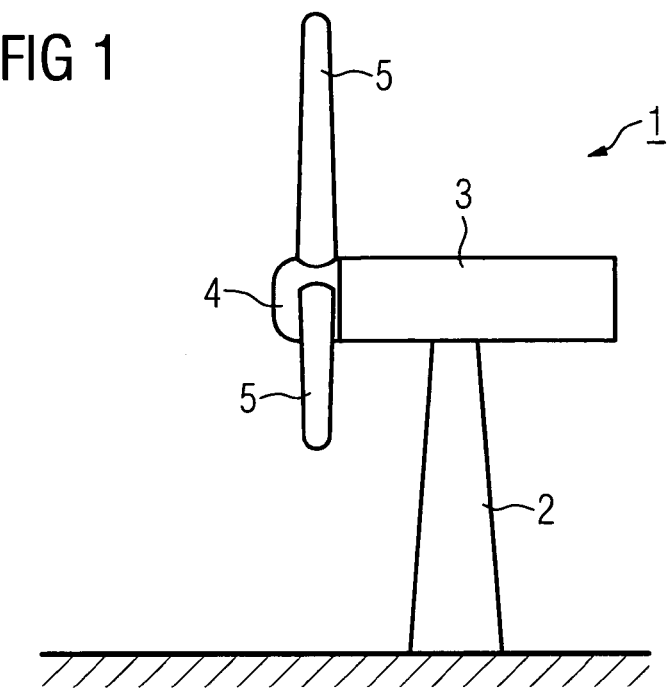
FIG. 1 shows a wind turbine in a side view.

FIG. 1 shows schematically an assembled wind turbine 1 in operation. The wind turbine 1 comprises a tower 2, a nacelle 3 and a rotor including a hub 4 with three pitch controlled rotor blades 5. Each rotor blade 5 is in a not explicitly shown manner mounted on a rotor blade bearing of the hub 4 in particular mounted on a rotating part of the rotor blade bearing. In case of the present embodiment of the invention a hydraulic pitch cylinder is assigned to each rotor blade 5 and the corresponding rotor blade bearing respectively. The hydraulic pitch cylinder interacts with the rotor blade 5 and/or the corresponding rotor blade bearing for the adjustment of the pitch of the rotor blade 5. Such a hydraulic pitch cylinder and its arrangement in the hub as well as its arrangement relatively to the rotor blade bearing and/or the rotor blade are e.g. disclosed in the European Patent Applications EP 07010505.1 and EP 07010504.4 which are incorporated by reference.

Figure 2:
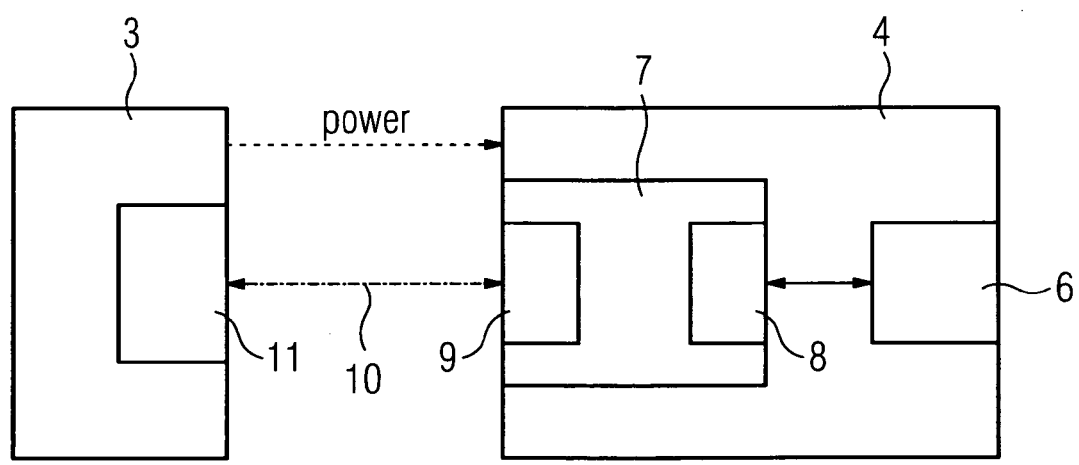
FIG. 2 shows the interface between the nacelle and the hub of the wind turbine.

The hydraulic pitch cylinder is as a rule part of a hydraulic system 6 of the hub 4 (cp. FIG. 2). The hydraulic system 6 is controlled by a hub control or a hub computer 7 wherein the hub computer 7 comprises or is connected to a valve controller 8 controlling the states of the valves of the hydraulic system 6 and thus also the states of the valves assigned to the three hydraulic pitch cylinders of the hub 4.

The hub computer 7 comprises furthermore a communication interface 9 connected to a communication bus 10. During operation of the wind turbine 1 wherein the hub 4 is attached to the nacelle 3 there is a bilateral communication or data transfer between the hub computer 7 and a wind turbine controller 11 of the wind turbine 1 wherein the wind turbine controller 11 is also connected to the communication bus 10. Additionally the hub 4 is supplied from the nacelle 3 with electrical power e.g. to operate the hub computer 7 as well as other electrical equipment located in the hub 4 like transducers and so on.

The data transmission and the transmission of energy across the interface between the nacelle 3 and the rotor which rotates relatively to the nacelle 3 is technically realised by not shown but well known slip rings, one for the data transmission and one for the energy transmission. During the normal operation of the wind turbine 1 the hub computer 7 as the slave of the communication system is controlled by the wind turbine controller 11 as the master of the communication system.

Figure 3:
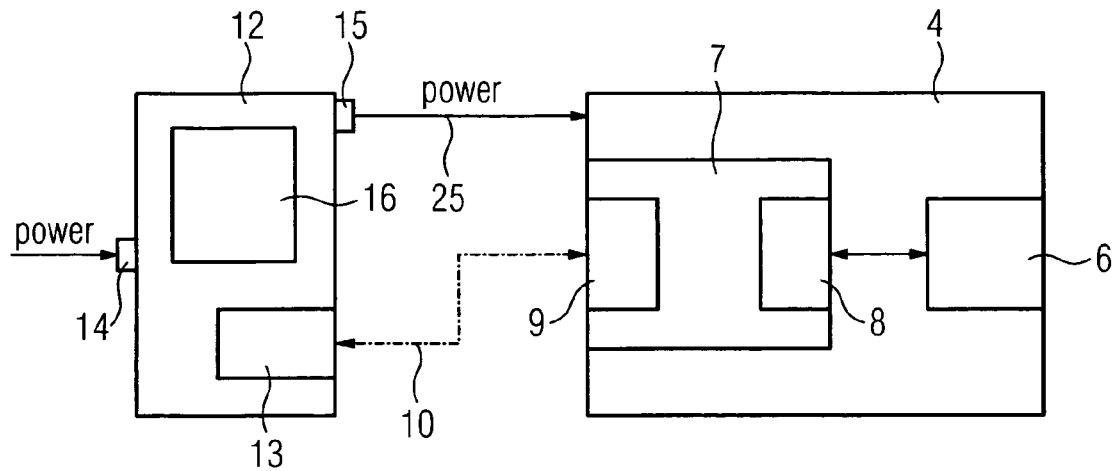
FIG. 3 shows the interface between a control device and the hub of the wind turbine and FIG. 4 shows the control device.
Figure 4:
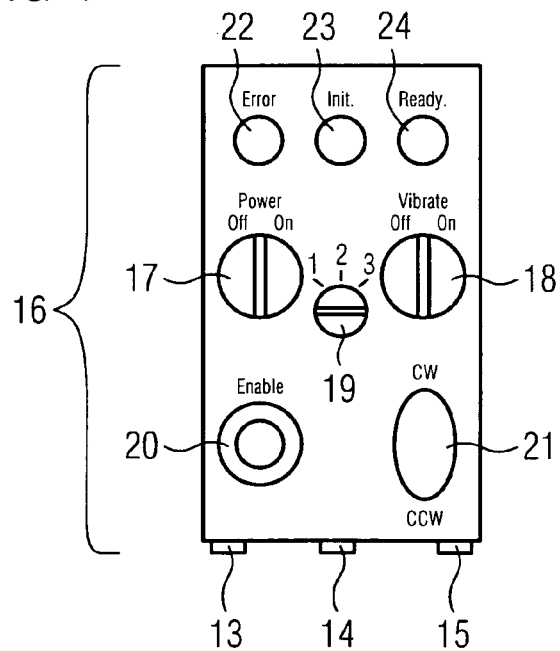

In opposite to the prior art initially mentioned according to the present invention the technical arrangement of the hub 4 as schematically shown on the right side of FIG. 2 is not changed or modified during the mounting of the hub 4 as the first component of the wind turbine 1 and a rotor blade 5 as the second component of the wind turbine 1 with each other as can be seen on the right side of FIG. 3. During the mounting of the hub 4 and the rotor blades 5 with each other the hub 4 is positioned on the ground and each rotor blade 5 is oriented and arranged such relatively to the corresponding rotor blade bearing e.g. by a mobile crane that bolts of the rotor blade 5 are able to be put through bolt holes of the rotating part of the rotor blade bearing of the hub 4. Subsequently the rotor blade and the rotating part of the rotor blade bearing of the hub are screwed together. Thereby it is necessary that also the rotating part of the rotor blade bearing is respectively adjusted relatively to the rotor blade for a defined connection of the two components.

To achieve this adjustment of the rotating part of the rotor blade bearing a control device 12 or a so called hub service tool is connected to the communication interface 9 of the hub computer 7 via the communication bus 10. The control device 12 comprises a communication interface 13 connected to the communication bus 10, a bus bar 14, an interface 15 for the power supply of the hub 4, and several input elements and status displays 16 in form of three switches 17-19, one button 20, one joystick 21 and three LEDs (light emitting diodes) 22-24.

Before the mounting starts the bus bar 14 of the control device 12 is connected to a power source, the interface 15 is connected via an electrical conduit 25 to the hub 4 for the electrical power supply of the hub 4 in particular of the hub computer 7 during the mounting and the communication interface 13 of the control device 12 is as mentioned before connected to the communication bus 10. During the mounting the hub computer 7 as the slave is controlled by the control device 12 as the master of the communication system.

Then the "Power" switch 17 is turned to the position "On" wherein an initialisation phase is started during which the yellow "Initialisation" LED 23 is illuminated and during which the communication between the control device 12 and the hub computer 7 via the communication bus 10 is established. After the initialisation phase as a rule the green "Ready" LED 23 is illuminated and the control device 12 is able to be used in case of the present embodiment of the invention to orient, swivel and/or rotate a rotating part of a rotor blade bearing for a defined mounting of a rotor blade 5 and the hub 4 in particular of a rotor blade bearing of the hub 4 with each other.

First an operator chooses one of the three rotor blade bearings whose rotating part shall be adjusted by turning the switch 19 to the respective position. Then the operator pushes the "Enable" button 20 and moves the joystick 21 upwards in the CW or downwards to the CCW direction. In dependence of the movement of the joystick 21 corresponding control instructions or control commands are generated in the control device 12 and provided or transmitted to the hub computer 7 and the valve controller 8. The hub computer 7 and/or the valve controller 8 interprets and/or converts these control instructions or control commands and the valve controller 8 controls the valves of the hydraulic system 6 in particular the valves assigned to the hydraulic pitch cylinder of the chosen rotor blade bearing that the rotating part of the rotor blade bearing is oriented, swivelled and/or rotated in the desired position for mounting with the rotor blade 5.

When the bolts of the rotor blade 5 are put through the bolt holes of the rotating part of the rotor blade bearing the "Vibrate" switch 18 is turned to the position "On". Then the chosen rotor blade bearing is slightly vibrated in its angle position to overcome slight deadlocks and/or the friction between the bolts of the rotor blade and the bolt holes of the rotating part of the rotor blade bearing. The vibration is as a rule realised by a slight oscillation of the rotating part of the rotor blade bearing around his centre axle. When the bolts are in the end position of the bolt holes the rotor blade 5 and the rotor blade bearing are screwed together with nuts.

This proceeding is done for each of the three rotor blades 5 wherein the respective rotor blade bearing is chosen by the switch 19.

If in any situation during the mounting an error occurs in the control device 12 the "Error" LED 22 is illuminated.

The control device 12 is in the case of the present embodiment a hand-held device and therefore easy to handle.

After the mounting of all rotor blades 5 on the hub 4 the control device 12 is removed from the hub 4 and the rotor is raised and mounted on the nacelle 3 (cp. FIG. 1 and FIG. 2).

Using the control device 12 for controlling a rotating part of a rotor blade bearing of the hub 4 during the mounting of the hub 4 and a rotor blade 5 with each other saves a lot a time during the mounting because there is no change of any basic existing cabling in particular of any hydraulic cabling of the hub 4 necessary. Compared with the prior art proceeding there is no more risk to connect wrong cables to the valves after the mounting.

The invention was described for a hub 4 comprising a hydraulic system in particular for adjusting the rotating part of a rotor blade bearing. But instead of the hydraulic system the hub can comprise an electrical system for the adjustment of the rotating part of a rotor blade bearing. In this case to each rotor blade bearing and to each rotor blade respectively an electric motor is assigned. In this case the pitch of a rotor blade is adjusted by an electrical system.

Furthermore the control device or a respectively adapted control device is able to be used to support the mounting of other components than a hub and a rotor blade of the wind turbine with each other. So the invention can be used for any subsystem of the wind turbine e.g. the gear system including a cooler and an oil pump.

The design of the control device is only exemplarily described. Thus in dependence of the control function the control device can be else designed.

The control device can also be used for the purpose of service of the wind turbine. Thus during a service the control device 12 can be connected to the communication interface 9 or the communication bus 10 to adjust a rotor blade 5 for a service inspection.

The invention claimed is:

1. A method for controlling a rotor blade bearing of a wind turbine, comprising:
   connecting a control device to a communication interface of a hub of the wind turbine, the connecting during a mounting of the hub and a rotor blade with each other and/or during a servicing of the wind turbine;
   controlling the rotor blade bearing via the control device by at least one action to a rotating part of the rotor blade bearing, the at least one action selected from the group consisting of orienting, swiveling, rotating, vibrating and oscillating; and
   disconnecting the control device after the mounting and/or servicing,
   wherein the control device is not permanently connected to the wind turbine.

2. The method according to claim 1, wherein the control device comprises a communication interface which is directly connected to the communication interface of the hub or which is connected to a communication bus to which the communication interface of the hub is connected.

3. The method according to claim 1, wherein the control device provides a control instruction or control command to a control of hub for controlling the the rotor blade bearing.

4. The method according to claim 1, wherein the control device comprises an input element.

5. The method according to claim 4, wherein the input element is selected from the group consisting of: a button, a joystick, a switch and combinations there of.

6. The method according to claim 1, wherein the control device supplies the hub with electrical energy.

* * * * *